(12) United States Patent
Inoue et al.

(10) Patent No.: US 6,615,789 B2
(45) Date of Patent: Sep. 9, 2003

(54) PISTON FOR INTERNAL COMBUSTION ENGINES

(75) Inventors: Akira Inoue, Yokohama (JP);
Nobuhisa Jingu, Shizuoka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/181,064

(22) PCT Filed: Nov. 30, 2001

(86) PCT No.: PCT/JP01/10474

§ 371 (c)(1),
(2), (4) Date: Jul. 12, 2002

(87) PCT Pub. No.: WO02/055848

PCT Pub. Date: Jul. 18, 2002

(65) Prior Publication Data

US 2002/0189583 A1 Dec. 19, 2002

(30) Foreign Application Priority Data

Jan. 12, 2001 (JP) ........................................ 2001-004875

(51) Int. Cl.⁷ ................................................. F02B 31/00
(52) U.S. Cl. .................... 123/193.6; 123/302; 123/307; 123/308
(58) Field of Search ............................. 123/193.6, 302, 123/307, 308, 309, 301, 432

(56) References Cited

U.S. PATENT DOCUMENTS

| 5,237,974 | A | * | 8/1993 | Isomoto et al. ............. 123/432 |
| 5,285,755 | A | * | 2/1994 | Regueiro .................. 123/193.6 |
| 5,551,392 | A | * | 9/1996 | Yamaji et al. ............... 123/308 |
| 5,622,150 | A | * | 4/1997 | Fraidl et al. ................. 123/307 |
| 6,047,592 | A |   | 4/2000 | Wirth et al. |
| 6,220,215 | B1 |   | 4/2001 | Morimoto |
| 6,336,438 | B1 | * | 1/2002 | Durnholz et al. ........... 123/301 |
| 6,418,905 | B1 | * | 7/2002 | Baudlot et al. ............. 123/302 |

FOREIGN PATENT DOCUMENTS

| DE | 197 13 030 | 10/1997 |
| EP | 1 006 265 | 6/2000 |

OTHER PUBLICATIONS

Patent Abstracts of Japan, vol. 1996, No. 5, May 31, 1996 & JP 08–014048 (Mitsubishi Motors Corp.), Jan. 16, 1996.

Patent Abstracts of Japan, vol. 2000, No. 9, Oct. 13, 2000 & JP 2000–154724 (Nissan Motor Co. Ltd.), Jun. 6, 2000.

Patent Abstracts of Japan, vol. 2000, No. 15, Apr. 6, 2001 & JP 2000 345847 (Nissan Motor Co. Ltd.), Dec. 12, 2000.

* cited by examiner

Primary Examiner—Marguerite McMahon
(74) Attorney, Agent, or Firm—Foley & Lardner

(57) ABSTRACT

A piston for an internal combustion engine, including a piston crown having a central axis, and a piston bowl disposed in the piston crown, on which two tumble flows of air are provided. The piston bowl has a generally V-shaped contour in section taken along a vertical plane intersecting the tumble flows, on which the two tumble flows are retained at an inclined state toward a central axis of the piston crown.

18 Claims, 6 Drawing Sheets

PISTON FOR INTERNAL COMBUSTION ENGINES

BACKGROUND OF THE INVENTION

The present invention relates to an improved piston for an internal combustion engine which is adapted to create a tumble flow of intake air in the combustion chamber for mainly attaining a stratified charge combustion.

U.S. Pat. No. 6,220,215 B1 discloses a piston for an in-cylinder direct injection gasoline engine which has a recess in the piston crown. Tumble flows of intake air introduced into a combustion chamber in an engine cylinder are created in the recess, and fuel injected into the combustion chamber is entrained on the tumble flows. A stratified charge flow of air-fuel mixture is thus formed and directed toward a spark plug.

SUMMARY OF THE INVENTION

However, since the recess of the piston crown in the above-described earlier technology has a plane bottom surface, the following problem tends to occur. If such a piston as described in the above-described earlier technology is employed in an in-cylinder direct injection engine having two intake valves and adapted to create two parallel tumble flows of intake air, the tumble flows will not be adequately adjusted at large flow velocity of the tumble flows under the high-speed engine operation. Cycle variation in flow velocity or turbulence of the tumble flows will be increased, and a flow of air-fuel mixture will be fluctuated to thereby fail to direct the tumble flows toward the spark plug. This causes deterioration of combustion stability of the engine.

There is a demand to solve the above-described problem. An object of the present invention is to improve combustion stability of an in-cylinder direct injection engine by retaining two parallel tumble flows at a stable state from a compression stroke of a piston to a combustion stroke thereof.

According to one aspect of the present invention, there is provided a piston for an internal combustion engine, comprising:

a piston crown having a central axis; and a piston bowl disposed in the piston crown, on which two tumble flows of air are provided, the piston bowl having a contour in section taken along a vertical plane intersecting the tumble flows, the contour including an inclined portion inclined toward the central axis of the piston crown, the two tumble flows being disposed at the inclined portion.

According to a further aspect of the present invention, there is provided a piston for an internal combustion engine, comprising:

a piston crown having a central axis; and a piston bowl disposed in the piston crown, on which two tumble flows of air are provided, the piston bowl including a bottom wall and opposed and inclined side walls connected with the bottom wall, the side walls being opposed to each other and inclined toward the central axis of the piston crown.

According to a still further aspect of the present invention, there is provided a piston for an internal combustion engine, comprising:

a piston crown including an intake side and an exhaust side; and a piston bowl disposed in the piston crown, the piston bowl having a generally V-shaped section taken along a vertical plane perpendicular to a direction extending from the intake side of the piston crown toward the exhaust side thereof.

According to a still further aspect of the present invention, there is provided an internal combustion engine, comprising:

a cylinder chamber;

a cylinder head enclosing the cylinder chamber;

a piston within the cylinder chamber, the piston cooperating with the cylinder chamber and the cylinder head to form a combustion chamber;

at least two intake ports in the cylinder head, communicating with the combustion chamber to introduce air into the combustion chamber;

at least two exhaust ports in the cylinder head, communicating with the combustion chamber;

an intake air control valve in each of the at least two intake ports, operative to deflect the air and create two tumble flows of the air in the combustion chamber;

a fuel injector in the cylinder head, operative to directly inject fuel into the combustion chamber;

a spark plug in the cylinder head, operative to ignite an air-fuel mixture in the combustion chamber;

wherein the piston includes:
a piston crown having a central axis; and
a piston bowl disposed in the piston crown, on which the two tumble flows of air are provided,
the piston bowl having a contour in section taken along a vertical plane intersecting the tumble flows, the contour including an inclined portion inclined toward the central axis of the piston crown, the two tumble flows being disposed at the inclined portion.

DETAILED DESCRIPTION OF THE PREFERED EMBODIMENT

Referring now to FIGS. 1 to 4, a piston of the present invention, which is incorporated into an in-cylinder direct injection engine, is explained.

Figure 1:
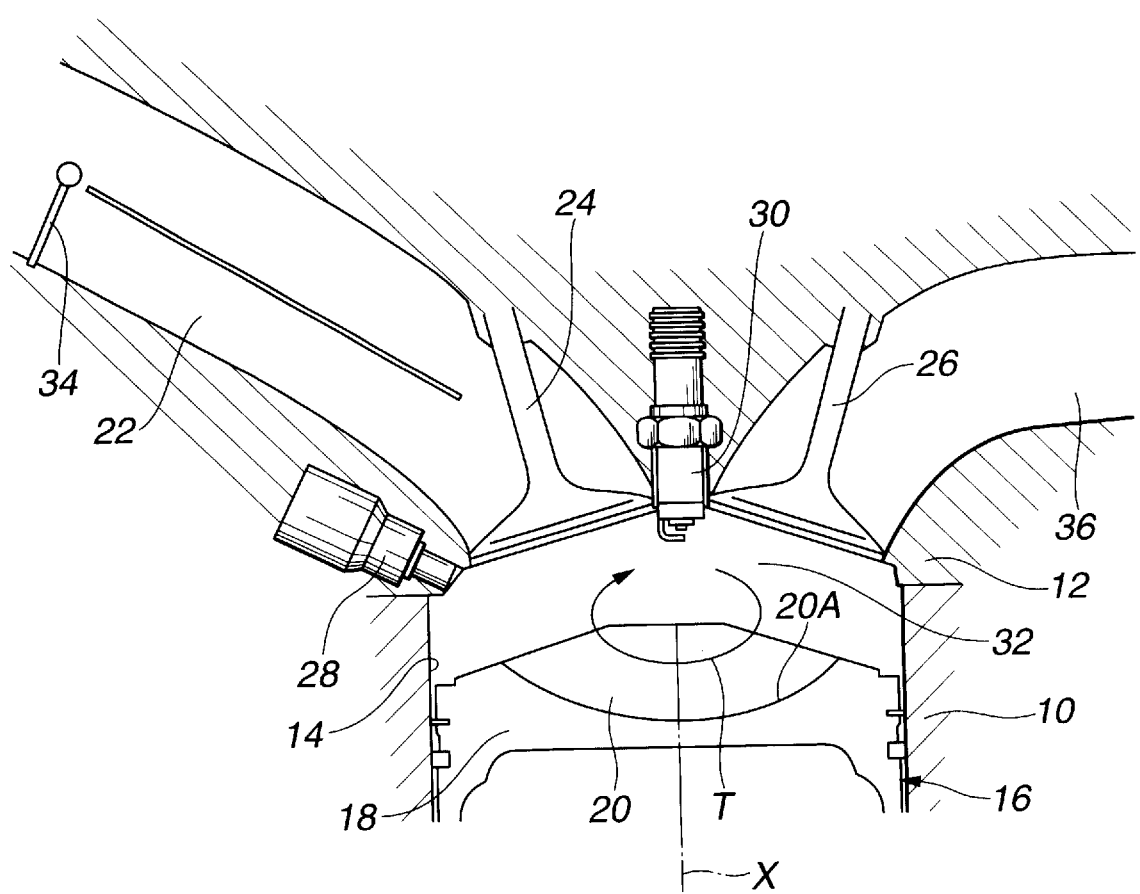
FIG. 1 is a vertical cross-section of an in-cylinder direct injection engine to which a piston according to a preferred embodiment of the present invention, is incorporated, showing a combustion chamber structure.
Figure 2:
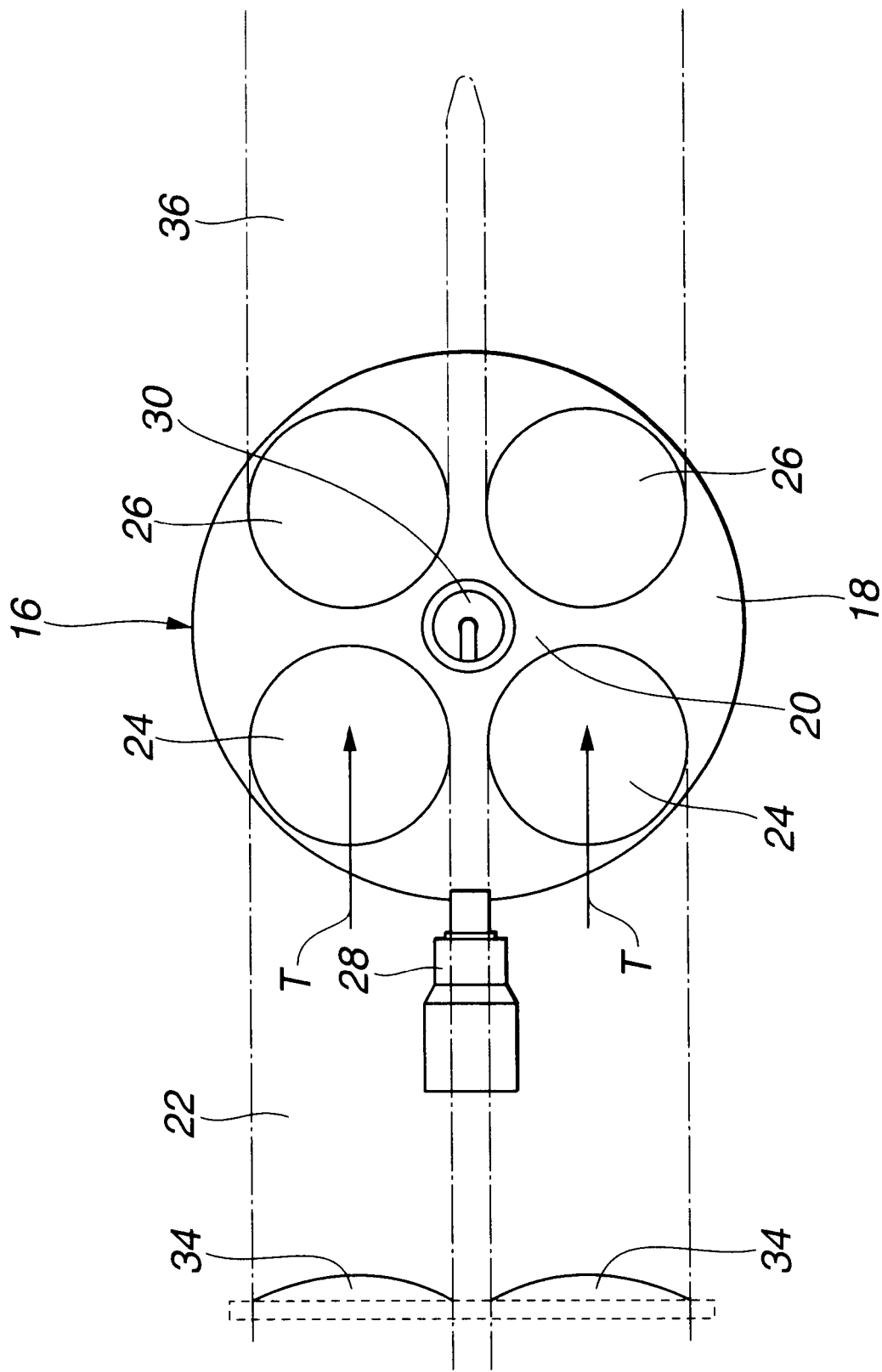
FIG. 2 is a schematic diagram showing arrangement of the engine parts around the combustion chamber as viewed from a lower side.
Figure 8:
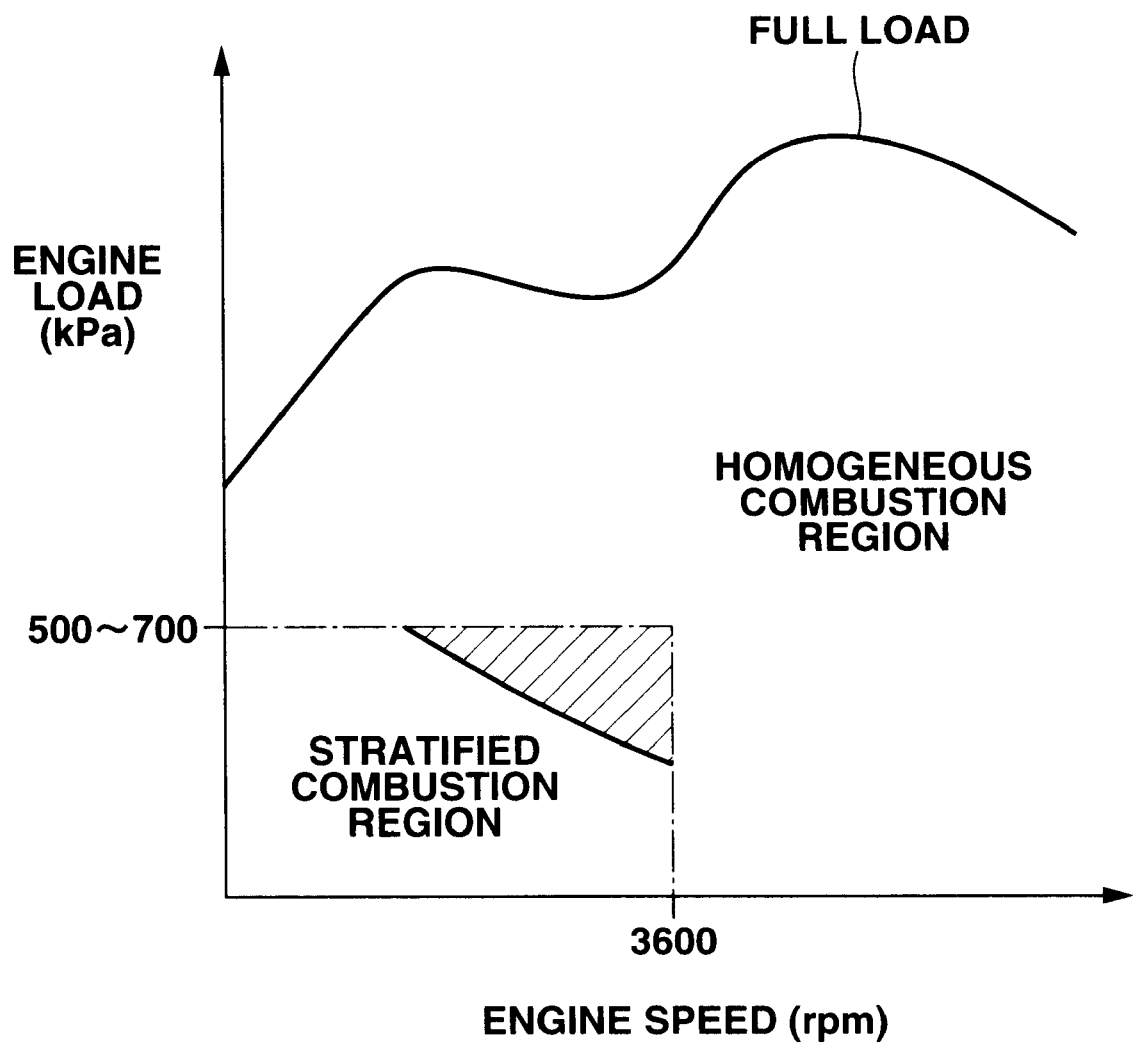
FIG. 8 is a map showing combustion regions relative to the engine operating conditions.

As illustrated in FIG. 1, the in-cylinder direct injection engine includes cylinder block 10 and a plurality of cylinder chambers or bores 14 disposed in cylinder block 10. Cylinder head 12 is mounted onto cylinder block 10 to enclose cylinder chambers 14. A plurality of pistons 16 each are disposed coaxially with corresponding cylinder chambers 14 and slidably fitted thereto, only one of which is shown for illustrative purposes. Four-valve cross-flow pent roof combustion chamber 32 is defined by cylinder block 10, cylinder head 12 and piston crown 18 of piston 16. Cylinder head 12 is formed with a pair of intake ports 22 corresponding to a pair of intake valves 24, and a pair of exhaust ports 36 corresponding to a pair of exhaust valves 26. Intake ports 22 communicate with combustion chamber 32 to introduce air into combustion chamber 32. Exhaust ports 36 communicate with combustion chamber 32 to exhaust air-fuel mixture burned within combustion chamber 32. One pair of intake ports 22 and intake valves 24, and one pair of exhaust ports 36 and exhaust valves 26 are shown in FIG. 1. Spark plug 30 is disposed in a middle wall portion of cylinder head 12 near the central axis of cylinder chamber 14. Spark plug 30 is positioned near an upper center portion of combustion chamber 32 which is surrounded by intake valves 24 and exhaust valves 26 as shown in FIG. 2. Intake air control valve 34 is disposed within each of intake ports 22 as shown in FIG. 2. Intake air control valve 34 is operated depending on engine operating conditions via an actuator, not shown, so as to move between an open position and a closed position. Intake air control valve 34 is moved to the closed position in a predetermined engine operating range explained later. In the closed position, intake air control valve 34 closes a part of intake port 22 and deflects the intake air flow directed toward combustion chamber 32 so as to create tumble flow (generally vertical vortex of air) T of the intake air within combustion chamber 32. Two tumble flows T of the intake air introduced from intake ports 22 are thus generated within combustion chamber 32 as shown in FIG. 2. In the predetermined engine operating range described above, an engine speed is not more than 3600 rpm and an engine load is 500–700 kPa (brake mean effective pressure). The engine operating range corresponds to a stratified combustion region squared in FIG. 8, in which a stratified charge combustion is attained. Fuel injector 28 is installed in a lower wall of cylinder head 12 as shown in FIG. 1, and located at a middle position between two intake ports 22 as shown in FIG. 2. Fuel injector 28 is designed to inject fuel spray into combustion chamber 32 in such a direction that the fuel spray is entrained on two tumble flows T and guided to near spark plug 30.

Figure 4:
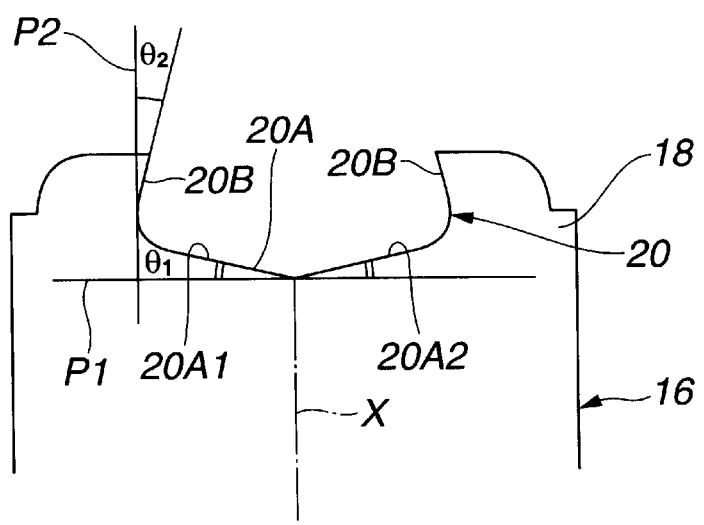
FIG. 4 is a cross-section taken along line 4—4 of FIG. 3.

Piston bowl 20 is disposed in piston crown 18 of piston 16, on which two tumble flows T are provided. Piston bowl 20 has a generally V-shaped contour in section taken along a vertical plane intersecting two tumble flows T, as shown in FIG. 4. Namely, the vertical plane is located perpendicular to a direction extending from the intake side of piston crown 18 toward the exhaust side thereof. As illustrated in FIG. 4, the contour includes an inclined portion inclined toward central axis X of piston crown 18. The inclined portion includes two opposed linear portions that extend linearly and inclinedly toward central axis X of piston crown 18 so as to gradually increase a depth of piston bowl 20. Two tumble flows T are located at the inclined portion as shown on the right side column of FIG. 5. Two tumble flows T are positioned downward in a direction of central axis X of piston crown 18 because of the increased depth of piston bowl 20.

Figure 3:
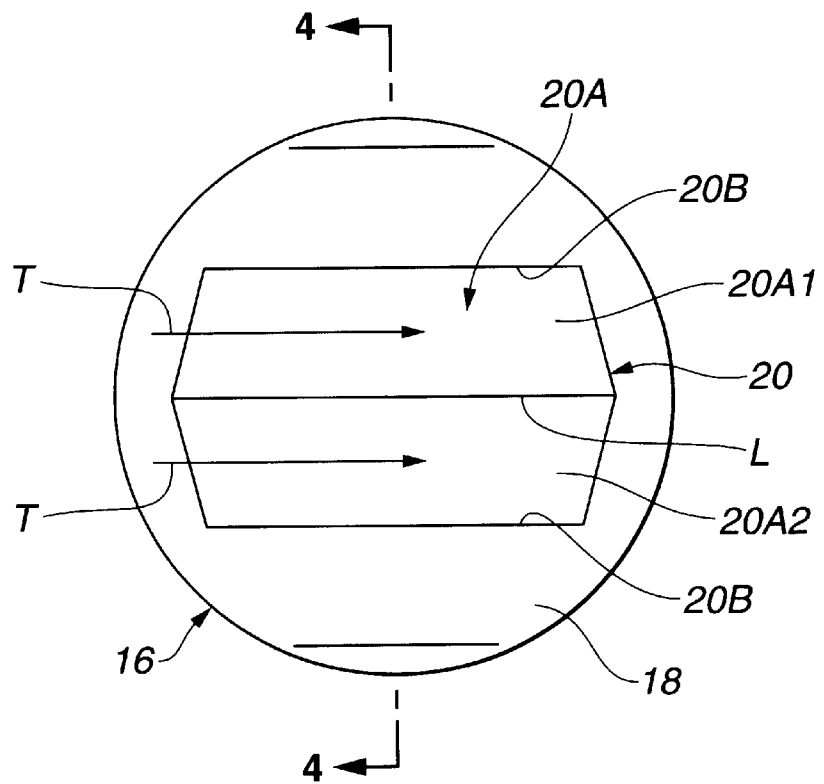
FIG. 3 is a top plan view of the piston.

Specifically, as seen from FIGS. 3 and 4, piston bowl 20 includes bottom wall 20A and side walls 20B connected with bottom wall 20A. Bottom wall 20A and side walls 20B cooperate to define the contour of piston bowl 20 as shown in FIG. 4. As illustrated in FIG. 3, bottom wall 20A includes bottom wall portions 20A1 and 20A2 extending from the intake side of piston crown 18 toward the exhaust side along tumble flows T. Bottom wall portions 20A1 and 20A2 are connected with each other at junction L shown in FIG. 3. Piston bowl 20 is positioned in a central portion of a top surface of piston crown 18 such that junction L of bottom wall portions 20A1 and 20A2 extends substantially across central axis X of piston crown 18. As shown in FIG. 4, bottom wall portions 20A1 and 20A2 are opposed to each other and inclined toward central axis X of piston crown 18. Bottom wall portions 20A1 and 20A2 define a V-shaped contour forming a part of the generally V-shaped contour of piston bowl 20. Bottom wall portions 20A1 and 20A2 are inclined at angle θ1, in this embodiment, approximately 7 degrees, relative to horizontal plane P1 of piston crown 18. Here, horizontal plane P1 of piston crown 18 means a plane perpendicular to central axis X of piston crown 18. Due to the inclination of bottom wall portions 20A1 and 20A2, two tumble flows T is retained thereon at an inclined state inclined toward central axis X of piston crown 18.

Side walls 20B are connected with opposed outer peripheries of bottom wall portions 20A1 and 20A2, respectively. Side walls 20B are opposed to each other and inclined toward central axis X of piston crown 18. Side walls 20B form inwardly inclined contours continuing with the V-shaped contour formed by bottom wall portions 20A1 and 20A2, which is a remaining part of the generally V-shaped contour of piston bowl 20. Side walls 20B are inclined at angle θ2, in this embodiment, approximately 10 degrees, relative to plane P2 perpendicular to horizontal plane P1 and parallel to central axis X of piston crown 18. Side walls 20B retain tumble flows T at the inclined state therealong.

As illustrated in FIG. 1, piston bowl 20 has a generally sector-shaped section taken along a vertical plane that is substantially parallel to two tumble flows T. Bottom wall 20A defines an arcuate contour in section as shown in FIG. 1, which is roundly curved along streamlines of tumble flows T.

Figure 5:
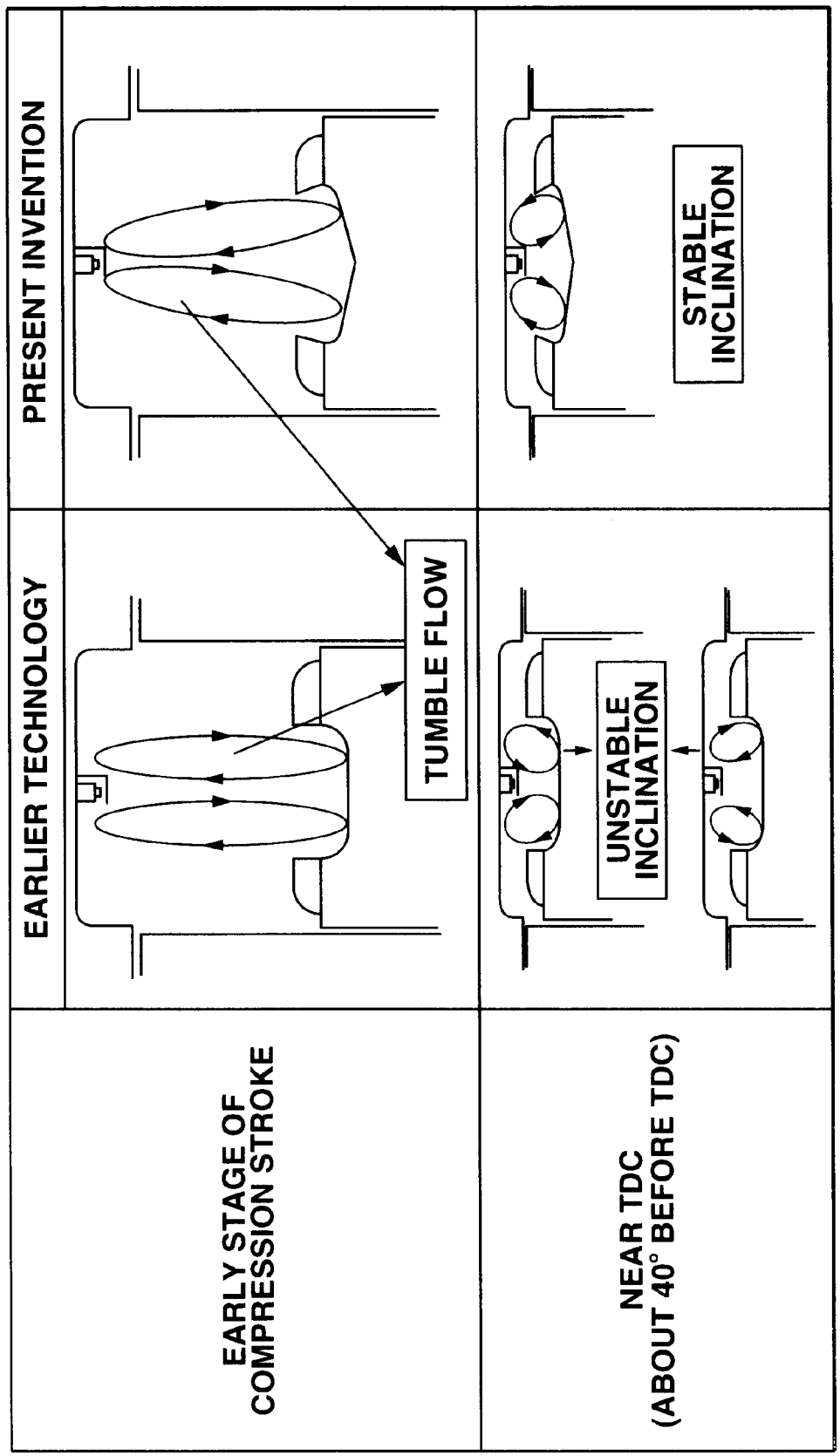
FIG. 5 is an explanatory-diagram showing function in the preferred embodiment in comparison with that in an earlier technology.
Figure 6:
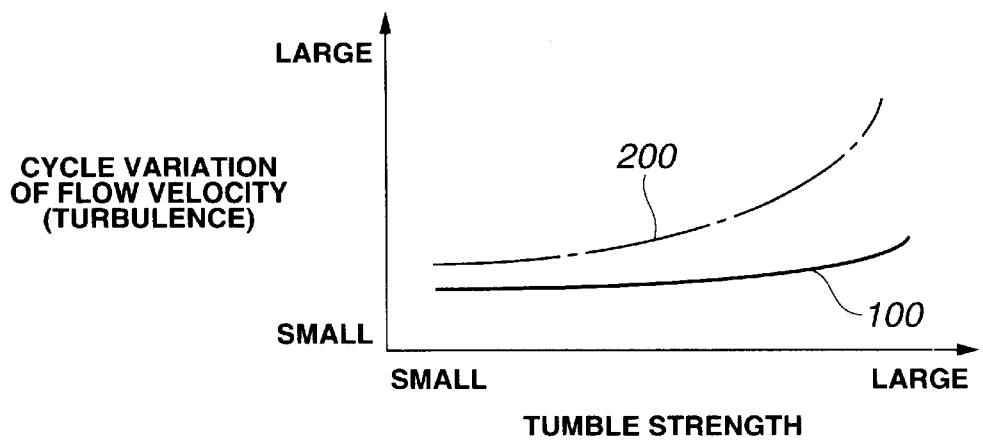
FIG. 6 is a graph showing a relationship between strength of tumble flows of intake air and cycle variation of flow velocity of the tumble flows in the preferred embodiment, and the similar relationship in an earlier technology.
Figure 7:
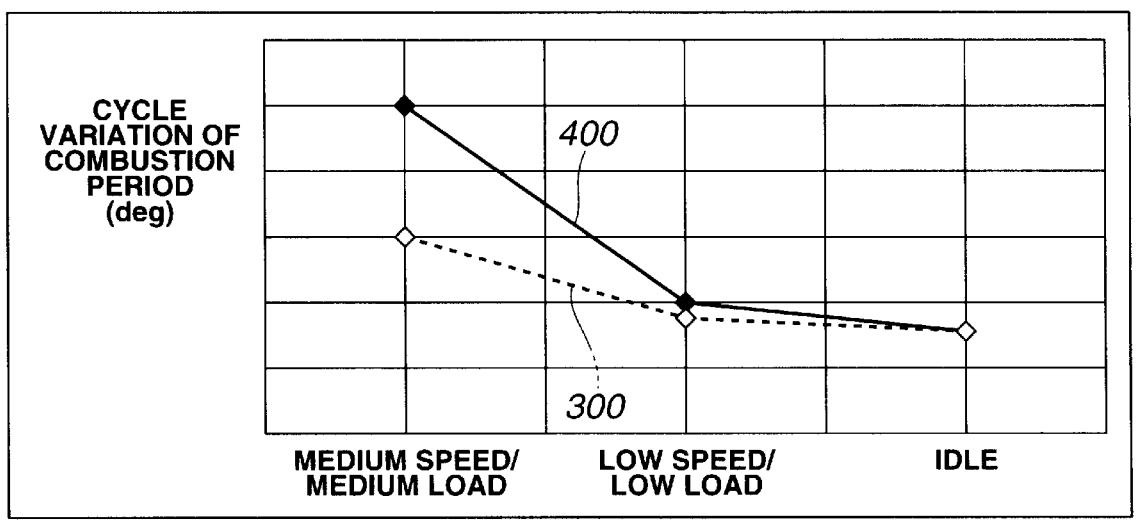
FIG. 7 is a graph showing a relationship between engine operating ranges and cycle variation of combustion period in the preferred embodiment, and the similar relationship in an earlier technology.

Referring to FIGS. 5–7, functions and effects of the piston of the present invention are explained in comparison with those of a piston in an earlier technology. In FIG. 5, the piston in the earlier technology is shown on the left side column of the figure, and the piston of the present invention is shown on the right side column. The piston in the earlier technology has the piston bowl whose bottom is defined by a planar surface. As illustrated on the upper part of the left side column of FIG. 5, two tumble flows of intake air within the combustion chamber are generated at an upright state on the piston bowl of the piston in parallel relation to the central axis of the piston crown at an early stage of the compression stroke. When the piston moves from the early stage position to a near-TDC position approximately 40 degrees before top dead center (TDC) as shown on the lower part of the left side column of FIG. 5, the inclination direction of each of the two tumble flows is indefinite and the tumble flow fluctuates. Due to the planar bottom surface of the piston bowl in the earlier technology, the unstable tumbling behavior of the two tumble flows is caused during the compression stroke of the piston.

Generally, near the TDC at a late stage of the compression stroke of the piston, stream of the tumble flow within the combustion chamber breaks and produces turbulence. Here, if a relatively strong turbulence is generated in the combustion chamber, rapid combustion of air-fuel mixture can be attained. Also, the strong turbulence entrains the fuel spray injected at the late stage of the compression stroke, to near the spark plug, so that a stratified charge combustion can be achieved. However, in the piston in the earlier technology as shown on the left side column in FIG. 5, the above-described unstable tumbling behavior of the tumble flows is caused when strong tumble flows are provided upon the engine operation at high load or high speed. This will cause large cycle variation or fluctuation of flow velocity or turbulence of the tumble flows as indicated by curve 200 in FIG. 6, and large cycle variation or fluctuation in fuel entrainment by the tumble flows to near the spark plug.

On the other hand, as illustrated on the upper part of the right side column of FIG. 5, two tumble flows of intake air which is created within the combustion chamber are disposed at an inclined state on the piston bowl of the piston of the present invention at the early stage of the compression stroke. This is because piston bowl 20, that includes V-shaped bottom wall 20A and inwardly inclined side walls 20B as explained above with reference to FIG. 4, restricts the inclination direction of the two tumble flows. Further, as shown on the lower part of the right side column of FIG. 5, even at the near-TDC position in the compression stroke of the piston, the tumble flows can be stably retained at the inclined state, so that stable stream and turbulence of the tumble flows can be produced. This will reduce cycle variation of flow velocity or turbulence of the tumble flows relative to tumble strength as indicated by curve 100 in FIG. 6, which is smaller than the cycle variation thereof in the earlier technology. The piston of the present invention can provide the stable flow of air-fuel mixture directed to near the spark plug during the compression stroke, which serves for achieving a stable combustion at the combustion stroke. Further, owing to the configuration, i.e., the V-shape in section, of the piston bowl of the piston of the present invention, a space between the spark plug and the bottom of the piston bowl is increased as compared with the space therebetween formed in the piston bowl in the earlier technology. A flame generated upon combustion of the air-fuel mixture in the combustion chamber can be better grown in the increased space, so that the combustion period can be reduced.

FIG. 7 shows cycle variation of combustion period relative to engine operating ranges as indicated by broken line 300, which is exhibited in the case of using the piston of the present invention. As illustrated in FIG. 7, the cycle variation of combustion period as indicated by broken line 300 is smaller than the cycle variation thereof indicated by line 400, which is exhibited in the case of using the piston in the earlier technology as shown on the left side column in FIG. 5. In the case of using the piston of the present invention, the cycle variation of combustion period is significantly reduced in the medium speed and medium load range of the engine operation. The medium speed and medium load range is indicated by hatching in FIG. 8.

Accordingly, the in-cylinder direct injection internal combustion engine using the piston of the present invention can ensure transportation of fuel spray injected from the fuel injector to near the spark plug and attain stable ignition of the air-fuel mixture to thereby exhibit good combustion stability.

This application is based on prior Japanese Patent Application No. 2001-004875 filed on Jan. 12, 2001, the entire contents of which are hereby incorporated by reference.

Although the invention has been described above by reference to a certain embodiment of the invention, the invention is not limited to the embodiment described above. Modifications and variations of the embodiment described above will occur to those skilled in the art in light of the above teachings. The scope of the invention is defined with reference to the following claims.

What is claimed is:

1. A piston for an internal combustion engine, comprising:
   a piston crown having a central axis; and
   a piston bowl disposed in the piston crown, on which two tumble flows of air are provided,
   the piston bowl having a contour in section taken along a vertical plane intersecting the tumble flows, the contour including an inclined portion inclined toward the central axis of the piston crown, the two tumble flows being disposed at the inclined portion.

2. The piston as claimed in claim 1, wherein the contour of the piston bowl is a generally V-shape including two opposed linear portions linearly and inclinedly extending to be joined together.

3. The piston as claimed in claim 2, wherein the piston bowl comprises a bottom wall and side walls which cooperate to define the generally V-shaped contour of the piston bowl, the bottom wall including opposed and inclined bottom wall portions forming a V-shaped contour, the side walls being connected with opposed outer peripheries of the bottom wall portions.

4. The piston as claimed in claim 3, wherein the side walls are inclined toward the central axis of the piston crown.

5. The piston as claimed in claim 3, wherein the bottom wall portions are inclined at an angle of approximately 7 degrees relative to a horizontal plane of the piston crown which is perpendicular to the central axis of the piston crown.

6. The piston as claimed in claim 4, wherein the side walls are inclined at an angle of approximately 10 degrees relative to a plane parallel to the central axis of the piston crown.

7. A piston for an internal combustion engine, comprising:
   a piston crown having a central axis; and
   a piston bowl disposed in the piston crown, on which two tumble flows of air are provided,
   the piston bowl including a bottom wall and opposed and inclined side walls connected with the bottom wall, the side walls being opposed to each other and inclined toward the central axis of the piston crown.

8. The piston as claimed in claim 7, wherein the side walls are inclined at an angle of approximately 10 degrees relative to a plane parallel to the central axis of the piston crown.

9. A piston for an internal combustion engine, comprising:
   a piston crown including an intake side and an exhaust side; and
   a piston bowl disposed in the piston crown, the piston bowl having a generally V-shaped section taken along a vertical plane perpendicular to a direction extending from the intake side of the piston crown toward the exhaust side thereof.

10. The piston as claimed in claim 9, wherein the piston crown has a central axis, the piston bowl comprising a bottom wall having a V-shaped section that forms a part of the generally V-shaped section of the piston bowl, the bottom wall including opposed and inclined bottom wall portions opposed to each other and inclined toward the central axis of the piston crown.

11. The piston as claimed in claim 10, wherein the piston bowl has side walls connected with opposed outer peripheries of the bottom wall portions and inclined toward the central axis of the piston crown.

12. The piston as claimed in claim 10, wherein the bottom wall portions are inclined at an angle of approximately 7 degrees relative to a plane perpendicular to the central axis of the piston crown.

13. The piston as claimed in claim 11, wherein the side walls are inclined at an angle of approximately 10 degrees relative to a plane parallel to the central axis of the piston crown.

14. The piston as claimed in claim 10, wherein the bottom wall portions have a junction at which the bottom wall portions are joined together, the junction extending substantially across the central axis of the piston crown.

15. An internal combustion engine, comprising:
- a cylinder chamber;
- a cylinder head enclosing the cylinder chamber;
- a piston within the cylinder chamber, the piston cooperating with the cylinder chamber and the cylinder head to form a combustion chamber;
- at least two intake ports in the cylinder head, communicating with the combustion chamber to introduce air into the combustion chamber;
- at least two exhaust ports in the cylinder head, communicating with the combustion chamber;
- an intake air control valve in each of the at least two intake ports, operative to deflect the air and create two tumble flows of the air in the combustion chamber;
- a fuel injector in the cylinder head, operative to directly inject fuel into the combustion chamber;
- a spark plug in the cylinder head, operative to ignite an air-fuel mixture in the combustion chamber;

wherein the piston includes:
- a piston crown having a central axis; and
- a piston bowl disposed in the piston crown, on which the two tumble flows of air are provided,
- the piston bowl having a contour in section taken along a vertical plane intersecting the tumble flows, the contour including an inclined portion inclined toward the central axis of the piston crown, the two tumble flows being disposed at the inclined portion.

16. The internal combustion engine as claimed in claim 15, wherein the contour of the piston bowl is a generally V-shape including two opposed linear portions linearly and inclinedly extending to be joined together.

17. The internal combustion engine as claimed in claim 16, wherein the piston bowl comprises a bottom wall and side walls which cooperate to define the generally V-shaped contour of the piston bowl, the bottom wall including opposed and inclined bottom wall portions forming a V-shaped contour, the side walls being connected with opposed outer peripheries of the bottom wall portions.

18. The internal combustion engine as claimed in claim 17, wherein the side walls are inclined toward the central axis of the piston crown.

\* \* \* \* \*